(12) United States Patent
    Takagi

(10) Patent No.: US 11,220,223 B2
(45) Date of Patent: Jan. 11, 2022

(54) VEHICLE-ENVIRONMENT MONITORING DEVICE

(71) Applicant: SUBARU CORPORATION, Tokyo (JP)

(72) Inventor: Hidemichi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/225,452

(22) Filed: Dec. 19, 2018

(65) Prior Publication Data

US 2019/0248300 A1    Aug. 15, 2019

(30) Foreign Application Priority Data

Feb. 13, 2018  (JP) .............................. JP2018-023490

(51) Int. Cl.
    *B60R 11/04*      (2006.01)
    *B60H 1/00*       (2006.01)
    (Continued)

(52) U.S. Cl.
    CPC ............ *B60R 11/04* (2013.01); *B60H 1/0055* (2013.01); *B60H 1/00271* (2013.01); *B60J 1/002* (2013.01); *B60R 2011/0005* (2013.01)

(58) Field of Classification Search
    CPC ........................... B60K 35/00; B60K 2370/21; B60K 2370/23; B60K 37/02; G06K 9/00791;
    (Continued)

(56) References Cited

U.S. PATENT DOCUMENTS

| 5,096,287 A | 3/1992 | Kakinami et al. |
| 2016/0119509 A1 | 4/2016 | Wato |

(Continued)

FOREIGN PATENT DOCUMENTS

| JP | 03-266739 A | 11/1991 |
| JP | 2001-088611 A | 4/2001 |

(Continued)

OTHER PUBLICATIONS

Office Action for JP Patent Application No. 2018-023490, dated Aug. 27, 2019, 02 pages of Office Action and 02 pages of English Translation.

*Primary Examiner* — Farhan Mahmud
(74) *Attorney, Agent, or Firm* — Chip Law Group

(57) ABSTRACT

Vehicle-environment monitoring device is capable of monitoring a situation outside a vehicle. The vehicle-environment monitoring device includes an image capturing module, an image-capturing-device cover, a fan, and an air passage. The image capturing module is disposed near an inner surface of a glass member and includes a heat-generating device and an image sensor configured to capture an image of the situation outside the vehicle. The image-capturing-device cover covers the image capturing module from inside a vehicle cabin. The fan cools the heat-generating device by introducing air into the image-capturing-device cover and blows the air toward the glass member. The air passage is formed inside the image-capturing-device cover, and the air blown by the fan flows toward the glass member through the air passage.

12 Claims, 11 Drawing Sheets

(51) Int. Cl.
    *B60J 1/00*         (2006.01)
    *B60R 11/00*       (2006.01)

(58) Field of Classification Search
    CPC . G06K 9/00805; B60S 1/56; G02B 2027/014; G02B 27/0006; B60R 2011/0026; B60R 1/00; B60R 11/04; B60R 2011/004; B60R 2300/105; G03B 15/00; H04N 5/225; B60H 2001/003; B60W 40/02; B60W 50/14; G01S 17/931
    See application file for complete search history.

(56) References Cited

U.S. PATENT DOCUMENTS

| | | | |
|---|---|---|---|
| 2017/0129404 A1 | 5/2017 | Oda | |
| 2017/0182952 A1 | 6/2017 | Carlson | |
| 2017/0184945 A1* | 6/2017 | Carlson | G03B 17/55 |
| 2017/0334364 A1* | 11/2017 | Usami | G03B 17/55 |
| 2019/0320159 A1* | 10/2019 | Ishii | H04N 5/2252 |

FOREIGN PATENT DOCUMENTS

| | | |
|---|---|---|
| JP | 2004-025930 A | 1/2004 |
| JP | 2016-078807 A | 5/2016 |
| JP | 2017-071334 A | 4/2017 |
| JP | 201792736 | 11/2018 |

\* cited by examiner

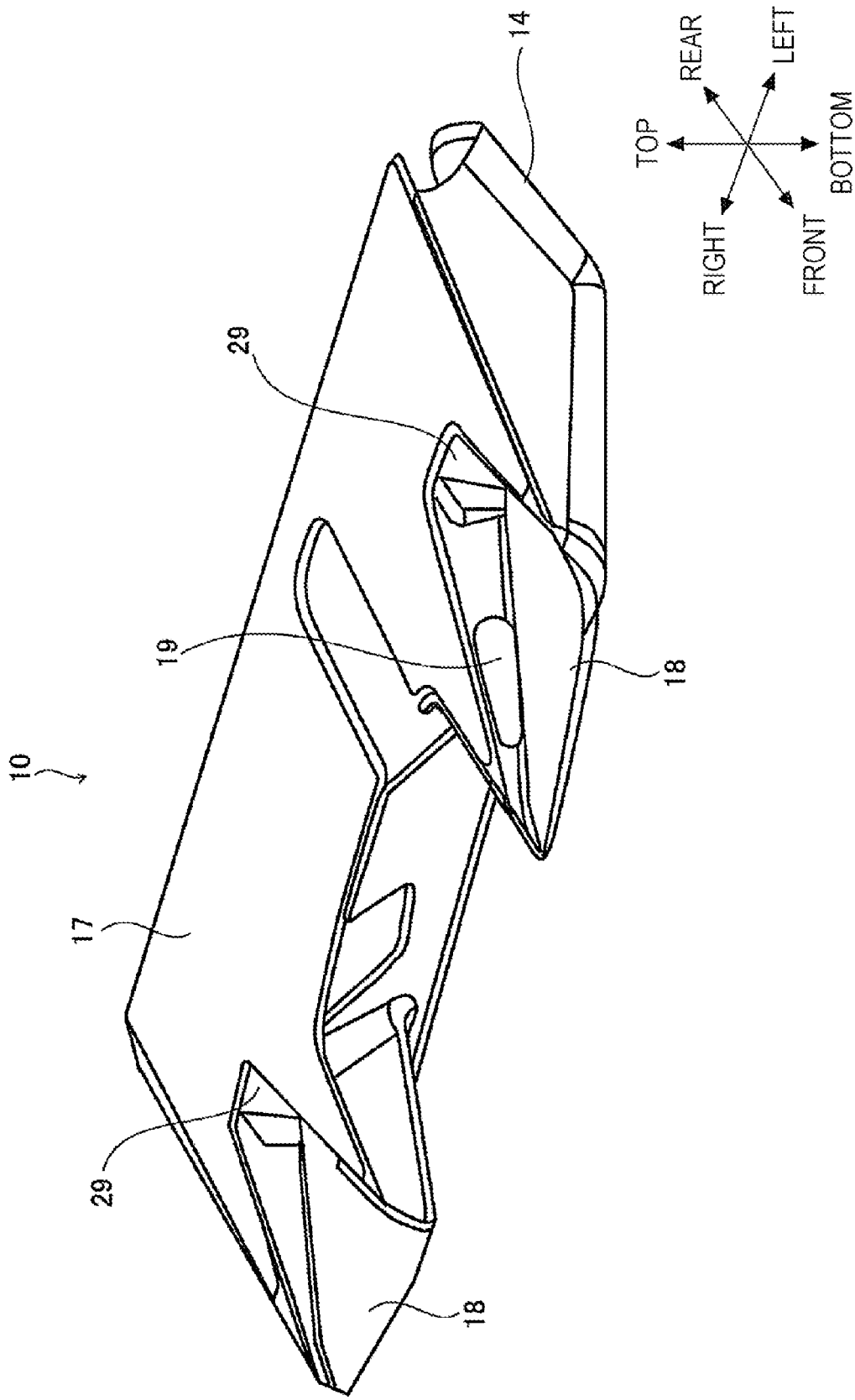

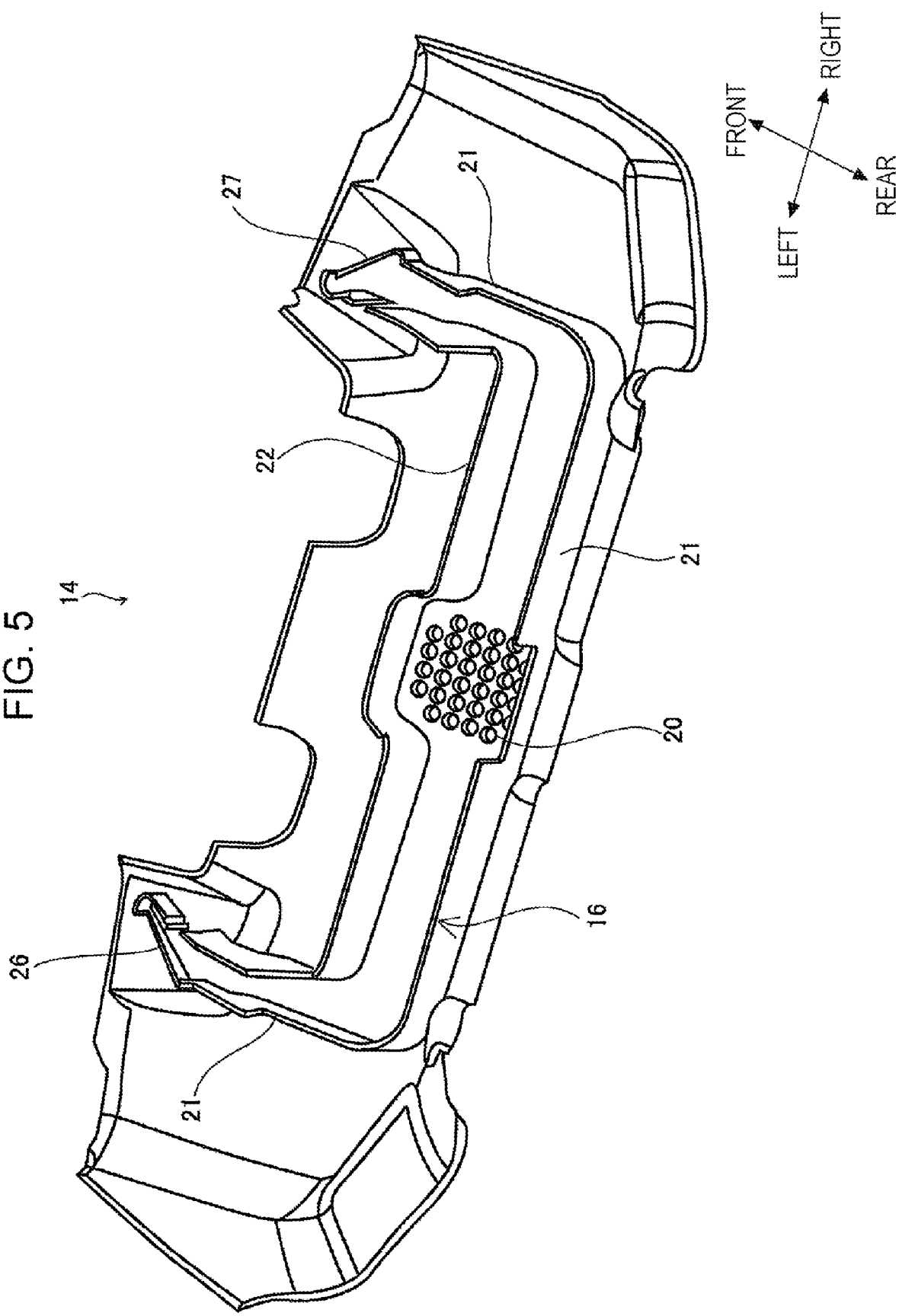

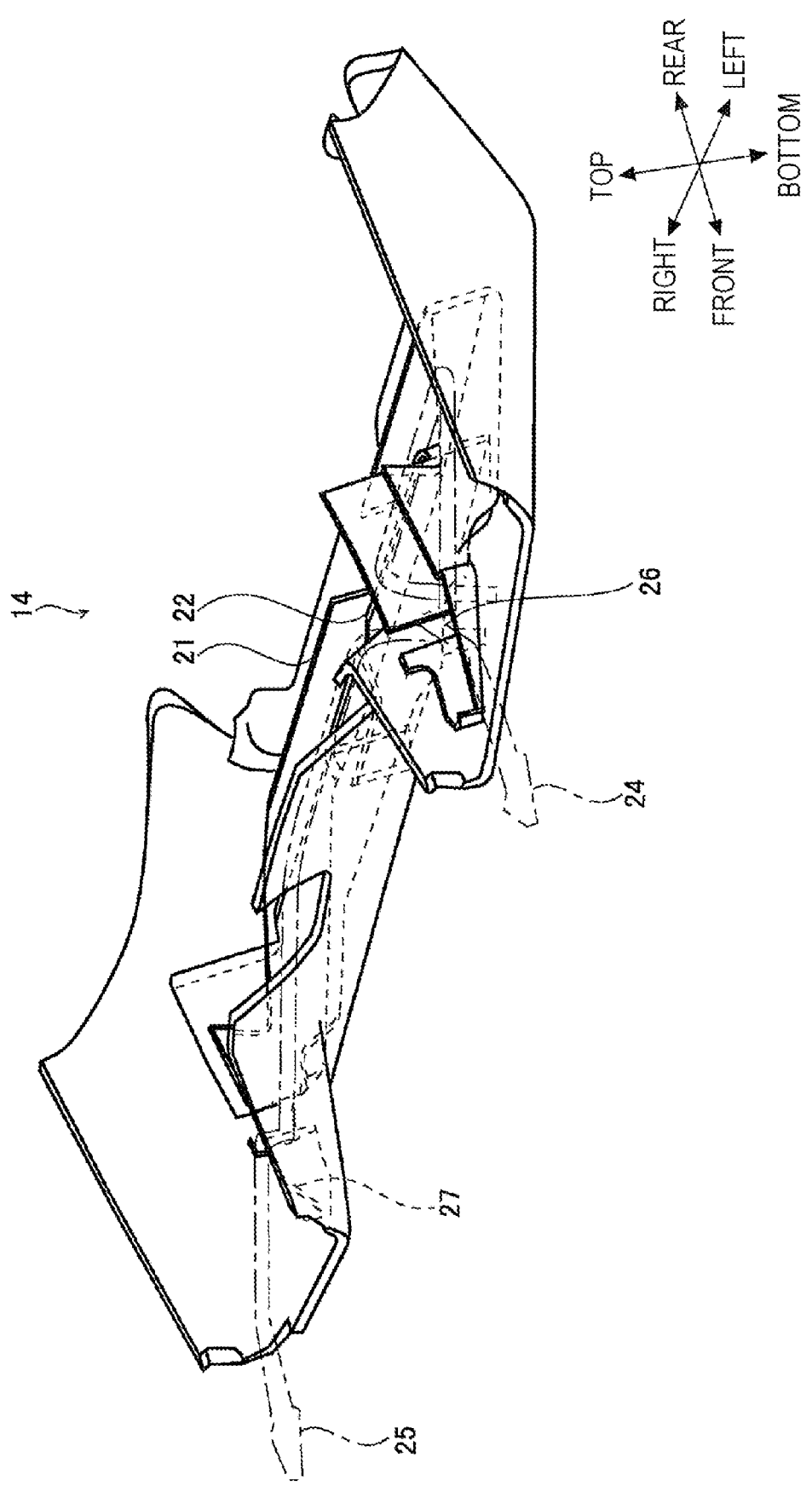

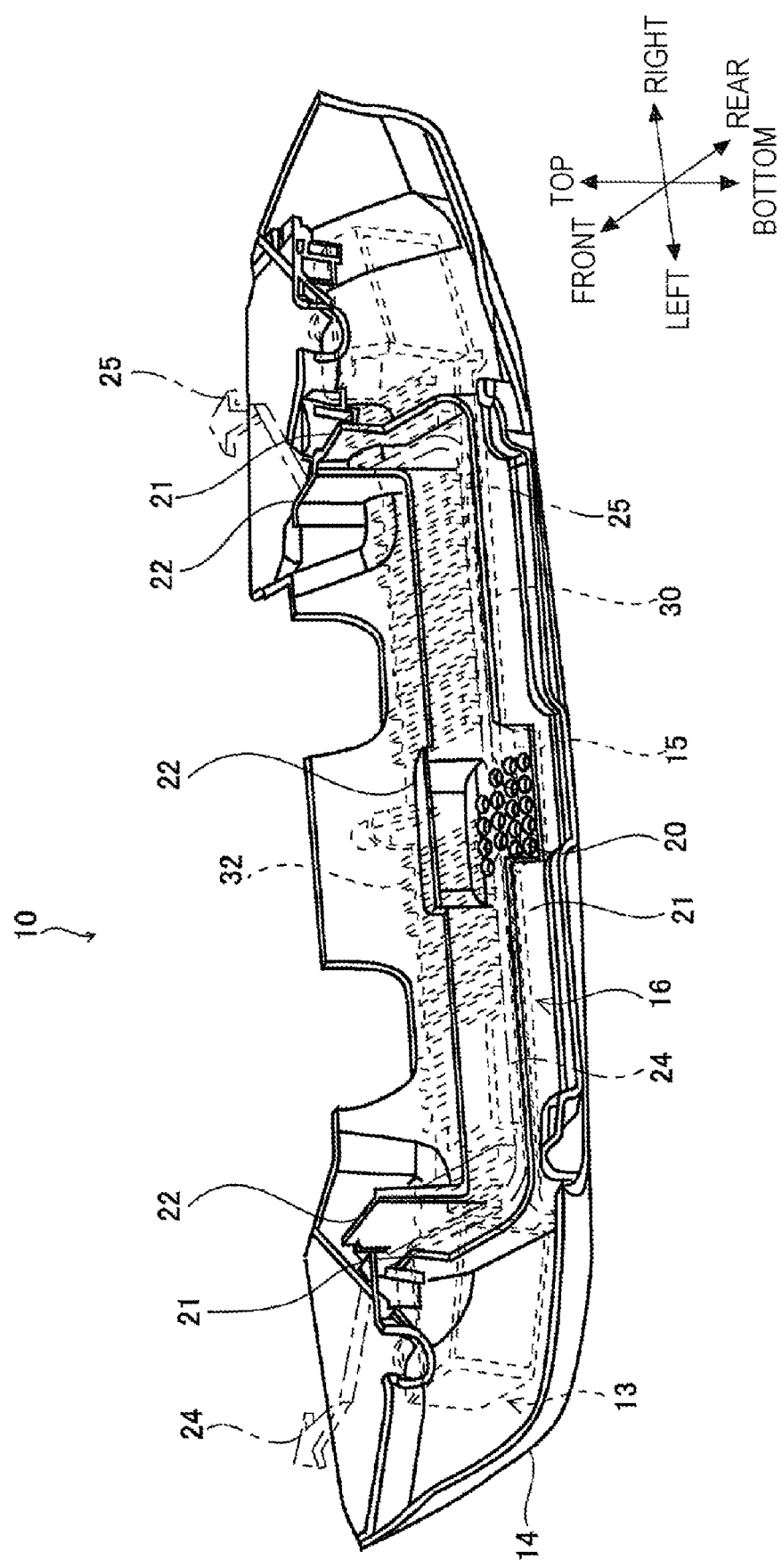

VEHICLE-ENVIRONMENT MONITORING DEVICE

CROSS-REFERENCE TO RELATED APPLICATIONS

The present application claims priority from Japanese Patent Application No. 2018-023490 filed on Feb. 13, 2018, the entire contents of which are hereby incorporated by reference.

BACKGROUND

1. Technical Field

The present invention relates to a vehicle-environment monitoring device and, more specifically, to a vehicle-environment monitoring device that monitors the situation outside a vehicle using image sensors.

2. Related Art

In recent years, stereo-type vehicle-environment monitoring devices using a pair of stereo cameras, which accommodate solid-state image sensors, such as complementary metal-oxide semiconductor (CMOS) devices, are used. In vehicle-environment recognition performed by such a vehicle-environment monitoring device, images of the environment in front of a vehicle are captured with the stereo cameras, and a predetermined calculation is performed on the basis of the captured image data (more specifically, distance data is calculated using the triangulation principle, and known grouping processing or the like is performed on the distance data) to recognize objects in the captured images.

The stereo cameras are disposed in close proximity to the windshield inside the vehicle cabin. Hence, when the windshield is fogged up, the stereo cameras cannot clearly capture images of the situation outside the vehicle and may be unable to accurately recognize the objects outside the vehicle.

Japanese Unexamined Patent Application Publication (JP-A) No. 2017-92736 describes an invention to solve the above-described problem. In that invention, a housing accommodates an image sensor for capturing an outside image through a windshield and a circuit board on which an electronic component for processing the image data captured by the image sensor is mounted. The housing has exhaust ports through which the heat generated by the electronic component is released. With this configuration, the heat generated by the electronic component is released toward the windshield, which is included in an image capturing area, thus preventing windshield fogging. JP-A No. 2017-92736 also describes the provision of a fan for generating an airflow to efficiently conducting heat.

SUMMARY OF THE INVENTION

An aspect of the present invention provides a vehicle-environment monitoring device capable of monitoring a situation outside a vehicle. The vehicle-environment monitoring device includes: an image capturing module, an image-capturing-device cover, a fan, and an air passage. The image capturing module is mountable near an inner surface of a glass member and includes a heat-generating device and an image sensor configured to capture an image of the situation outside the vehicle. The image-capturing-device cover covers the image capturing module from inside a vehicle cabin. The fan configured to cool the heat-generating device by introducing air into the image-capturing-device cover and blow the air toward the glass member. The air passage is formed inside the image-capturing-device cover and through which the air blown by the fan flows toward the glass member.

BRIEF DESCRIPTION OF THE DRAWINGS

FIGS. 3A and 3B are perspective views of the vehicle-environment monitoring device according to the example of the present invention;

FIG. 5 is a perspective view of an image-capturing-device cover of the vehicle-environment monitoring device according to the example of the present invention;

FIGS. 6A and 6B are perspective views illustrating air passages formed inside the image-capturing-device cover of the vehicle-environment monitoring device according to the example of the present invention; and FIGS. 7A and 7B are perspective views illustrating the air passages formed inside the vehicle-environment monitoring device according to the example of the present invention.

DETAILED DESCRIPTION

A vehicle-environment monitoring device 10 according to an example of the present invention will be described in detail below with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. In the description below, basically, the same components will be denoted by the same reference signs, and repeated descriptions thereof will be omitted. In the description below, the top, bottom, front, rear, left, and right directions will be used. The left and right are the directions as viewed from a vehicle 11 facing forward.

Although JP-A No. 2017-92736 describes the invention for efficiently transferring the heat generated by the electronic component to the windshield with the fan, specific airflow paths and other factors are not considered. Hence, a further improvement is needed to more efficiently prevent windshield fogging.

Another method for minimizing windshield fogging may be heating the windshield in front of the camera using a heater patch. However, using a heater patch increases the cost. In addition, such a configuration requires a fogging sensor for monitoring windshield fogging, which may further increase the cost. Furthermore, the heater patch consumes a large amount of power, which is problematic.

It is desirable to provide a vehicle-environment monitoring device that can more efficiently defog a glass member in front of the image sensor.

Figure 1A:
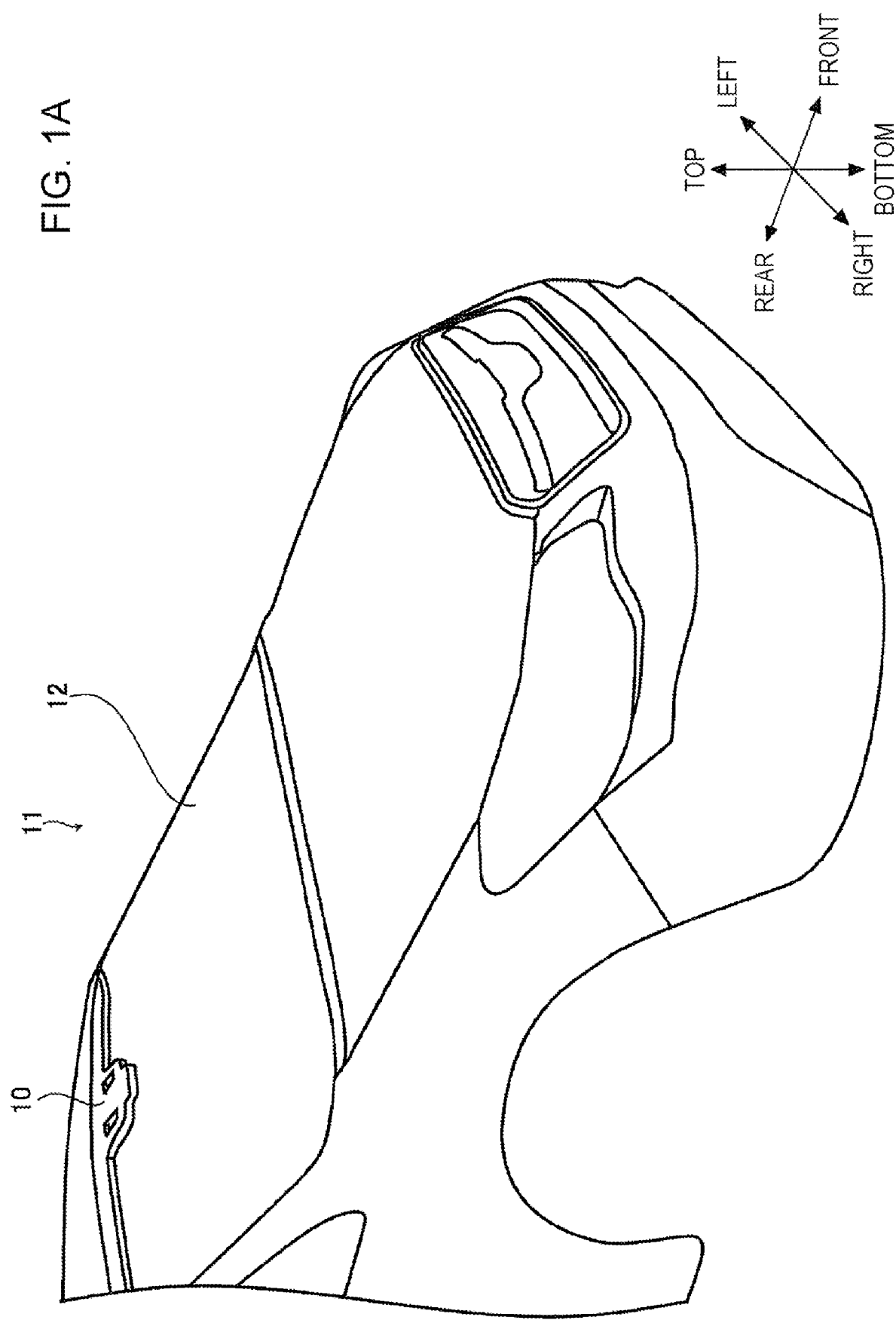
FIGS. 1A and 1B are perspective views of a vehicle in which a vehicle-environment monitoring device according to an example of the present invention is installed, FIG. 1A illustrating the front section of the vehicle, FIG. 1B being an enlarged perspective view of a portion to which the vehicle-environment monitoring device is attached.

Referring to FIG. 1A, the vehicle-environment monitoring device 10 according to this example is provided on the vehicle 11 (e.g., a passenger car). The vehicle-environment monitoring device 10 is disposed near the upper end of a windshield 12, substantially at the center in the left-right direction of the vehicle 11. Herein, for example, the windshield 12 is the glass member on which the vehicle-environment monitoring device 10 is disposed.

Figure 1B:
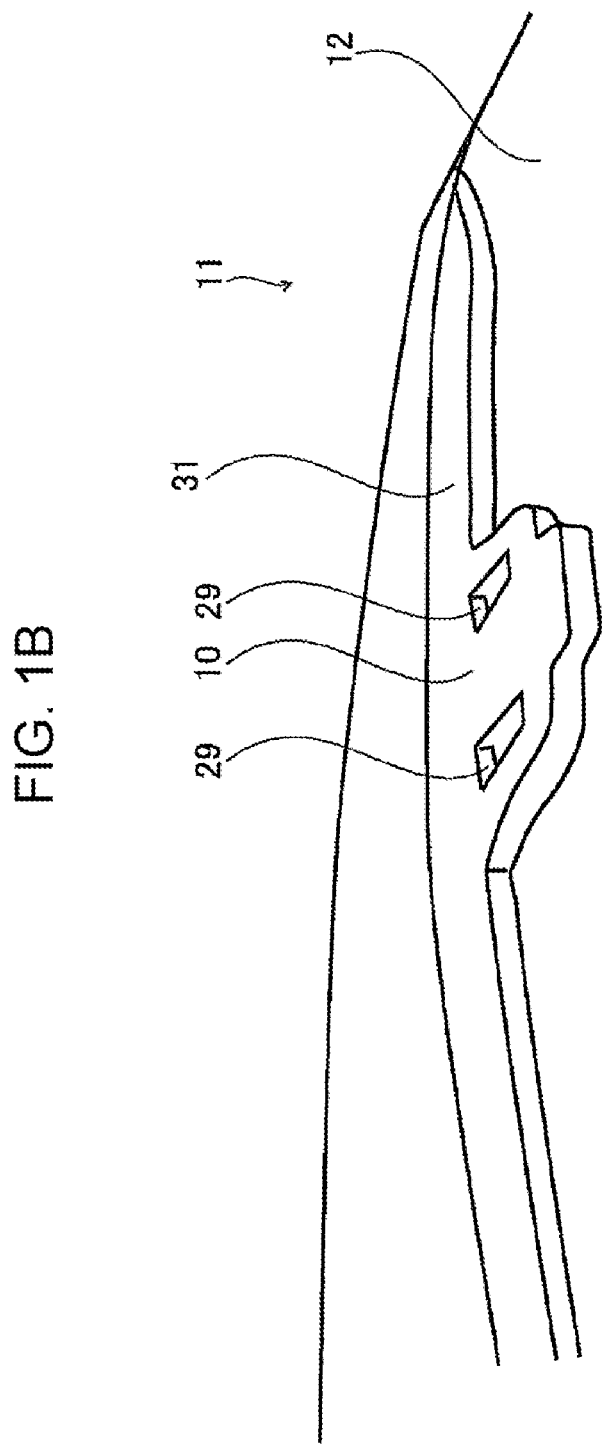

Referring to FIG. 1B, the vehicle-environment monitoring device 10 is disposed behind a portion of the windshield 12 covered by a ceramic line 31 that is a light shielding member at an end of the windshield 12). Image sensors 29 of the vehicle-environment monitoring device 10 are exposed to the front side from partially cut-away portions in the ceramic line 31. Inside the vehicle cabin, the image sensors 29 are disposed in close proximity to the windshield 12 to achieve a wide angle of view. Hence, the gap between the vehicle-environment monitoring device 10 and the windshield 12 is small, and thus, a portion of the windshield 12 near the vehicle-environment monitoring device 10 easily fogs up. In this example, as will be described below, fogging of the windshield 12 is prevented by sending warm air to the gap with a fan 15, which is built in the vehicle-environment monitoring device 10.

Figure 2:
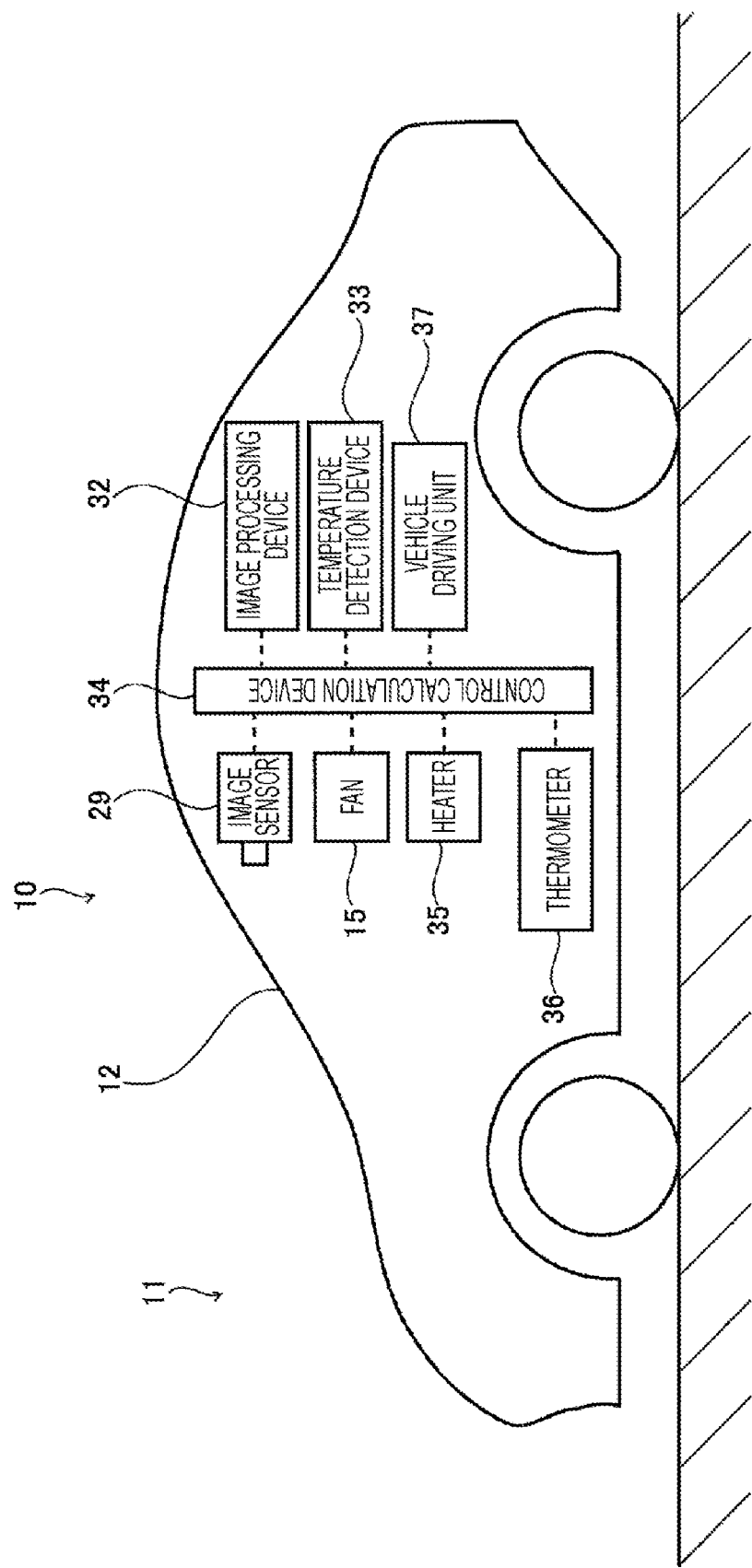
FIG. 2 illustrates the connection between components related to the vehicle-environment monitoring device according to the example of the present invention.

Referring to FIG. 2, the connection between the components related to the vehicle-environment monitoring device 10 and the like according to this example will be described. The vehicle-environment monitoring device 10 mainly includes the image sensors 29, a control calculation device 34, an image processing device 32, a temperature detection device 33, and the fan 15.

The image sensors 29 are, for example, solid-state image sensors, such as CMOS and charge-coupled device (CCD) sensors, and capture images of the environment in front of the vehicle 11 through the windshield 12. The vehicle-environment monitoring device 10 according to this example includes two image sensors 29, which constitute the stereo cameras.

The control calculation device 34 includes a central processing unit (CPU), a random-access memory (RAM), and a read-only memory (ROM) and controls the operations of the respective components of the vehicle-environment monitoring device 10. The control calculation device 34 is also referred to as an electronic control unit (ECU).

The image processing device 32 is a semiconductor device that performs predetermined image processing on the basis of the image data transferred from the image sensors 29 upon instruction from the control calculation device 34. The image processing device 32 is an image-processing semiconductor chip that is made of a field programmable gate array (FPGA) and is a heat-generating device that generates a large amount of exhaust heat during image processing. In this example, by sending the air inside the vehicle cabin to the image processing device 32 with the fan 15, overheating of the image processing device 32 is prevented. Furthermore, as will be described below, the windshield 12 is defogged by sending the warm air resulting from cooling the image processing device 32 to the windshield 12.

The vehicle 11 also includes the temperature detection device 33, a vehicle driving unit 37, a heater 35, and a thermometer 36.

The temperature detection device 33 detects the temperature of the image processing device 32. The vehicle driving unit 37 controls the driving devices (the engine and the motor), the brake device (the brake), the steering device (the steering wheel) of the vehicle 11 on the basis of the instruction from the control calculation device 34. The heater 35 heats reflection reduction members 18 (described below) and includes, for example, an electric heater. The thermometer 36 measures the temperature of the image sensors 29. In one example, the heater 35 may serve as a heating unit".

The function of the vehicle-environment monitoring device 10 will be described. The vehicle-environment monitoring device 10 constitutes a vehicle driving assistance device. More specifically, the image processing device 32 of the vehicle-environment monitoring device 10 calculates distance data on the basis of reference image data and comparison image data input from the image sensors 29, which captures images of the environment in front of the vehicle. The image processing device 32 performs known grouping processing on the distance data to extract various three-dimensional objects and the like. Herein, examples of the three-dimensional objects include lane lines, guardrails, curbs, motorcycles, standard-sized vehicles, large-sized vehicles, pedestrians, and utility poles.

The vehicle driving unit 37 controls the driving devices, the brake device, and the steering device on the basis of the instructions from the image processing device 32 and the control calculation device 34. For example, the vehicle driving unit 37 can slow down or stop the vehicle 11 by controlling the brake device and the driving devices. Furthermore, the vehicle driving unit 37 can correct the travelling direction of the vehicle 11 by controlling the steering device. The vehicle driving unit 37 can also perform cruise control (adaptive cruise control; ACC), in which the inter-vehicle distance is controlled, by controlling the driving devices, the brake device, and the steering device.

The vehicle-environment monitoring device 10 defogs as follows. When a user drives the vehicle 11, the control calculation device 34 measures the temperature of the image sensors 29 using the thermometer 36. When the measured temperature is lower than or equal to a predetermined value, the control calculation device 34 heats the reflection reduction members 18 (described below) with the heater 35. If necessary, the fan 15 is rotated to send the air inside the vehicle cabin to the windshield 12. By doing so, the windshield 12 near the reflection reduction members 18 is heated, minimizing fogging of the windshield 12. Thus, it is possible to clearly capture, with the image sensors 29, images of the environment in front of the vehicle 11 through the windshield 12. The heater 35 heats the reflection reduction members 18. Hence, the heater 35 is away from the image sensors 29. Thus, the image sensors 29 are not heated unnecessarily.

If the temperature of the image processing device 32 measured by the temperature detection device 33 is higher than or equal to a predetermined value, the control calculation device 34 causes the fan 15 to rotate, thus sending the air inside the vehicle cabin toward the image processing device 32. By doing so, the image processing device 32 is cooled and is prevented from being overheated. The fan 15 sends the warm air, obtained by cooling the image processing device 32, to the windshield 12 in front of the image sensors 29. This minimizes fogging of the windshield 12, enabling the image sensors 29 to more clearly capture images of the environment in front of the vehicle 11 through the windshield 12. As will be described below, in this example, air passages for directing the warm air, obtained by cooling the image processing device 32, to the windshield 12 are formed.

Figure 3B:
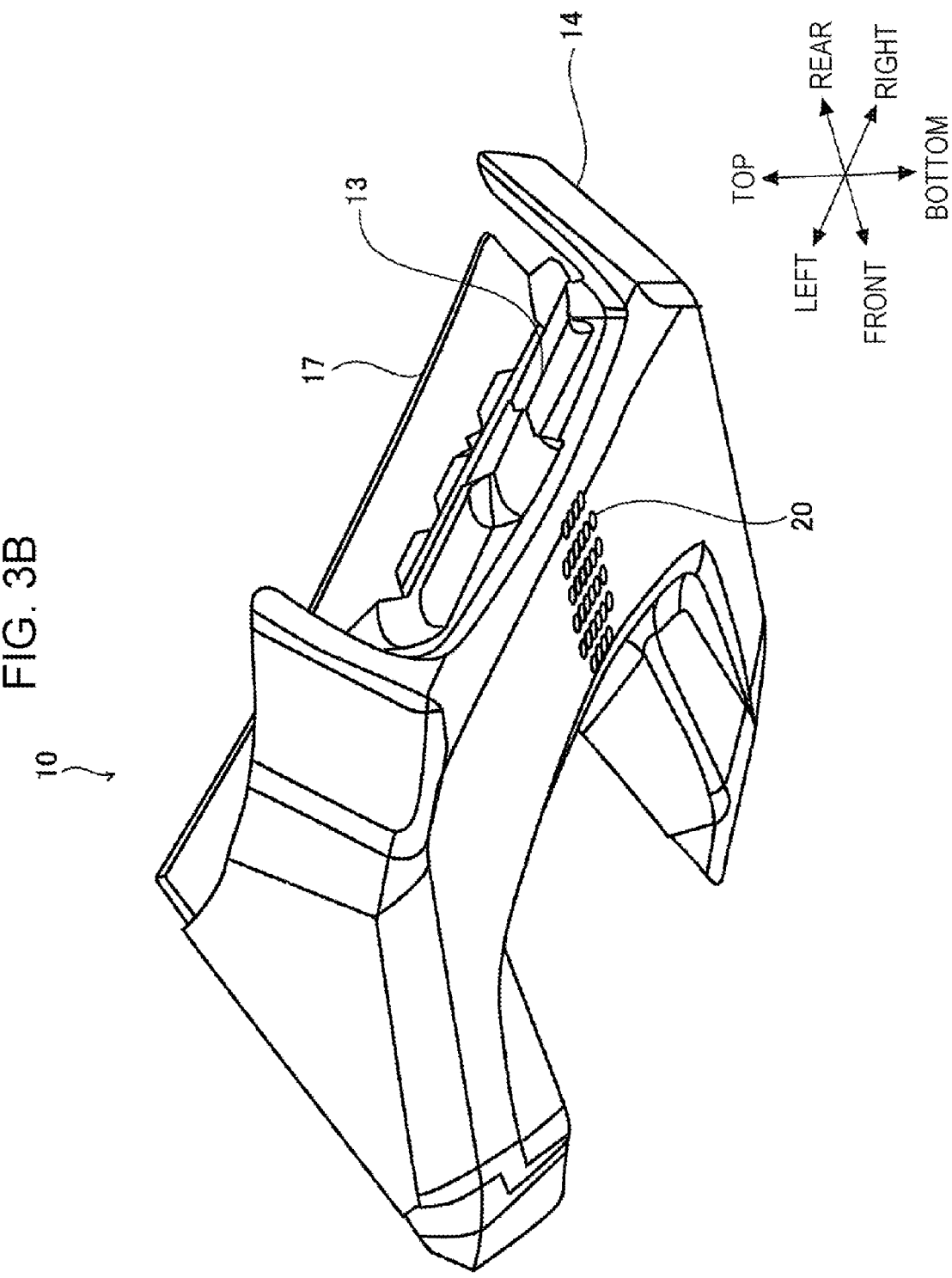

FIGS. 3A and 3B illustrate the vehicle-environment monitoring device 10. FIG. 3A is a perspective view of the vehicle-environment monitoring device 10, as viewed from the upper front side, and FIG. 3B is a perspective view of the vehicle-environment monitoring device 10, as viewed from the lower rear side.

Referring to FIGS. 3A and 3B, the vehicle-environment monitoring device 10 includes, from the top, a bracket 17, the reflection reduction members 18, and an image-capturing-device cover 14. These members are formed from, for example, a synthetic resin by injection molding. The bracket 17 is securely adhered to the inner surface of the windshield 12, and the image-capturing-device cover 14 is, for example, securely fitted to the bracket 17. An image capturing module 13 (described below) is also securely fitted to the bracket 17.

Referring to FIG. 3A, the reflection reduction members 18 are built into the front end, on both the left and right sides, of the bracket 17. As viewed from above, the reflection reduction members 18 have substantially a triangular shape which spreads toward the front side. The vehicle-environment monitoring device 10 has two image sensors 29 constituting the two stereo cameras, and the reflection reduction members 18 are disposed in front of the image sensors 29. The reflection reduction members 18 block the light coming from below toward the windshield 12 to inhibit the light from being reflected at the inner surface of the windshield 12 toward the image sensors 29. The front sides of the reflection reduction members 18 and the vicinity thereof are substantially in tight contact with the inner surface of the windshield 12.

Furthermore, the inner side surfaces of the reflection reduction members 18 are partially removed to provide slits 19. The air having cooled the image processing device 32 is blown out of the slits 19 and heats the windshield 12 in front of the reflection reduction members 18. By sending the air forward through the slits 19, the windshield 12 in front of the image sensors 29 can be more reliably defogged.

A slight gap is formed between the windshield 12 and the reflection reduction members 18. The air blown to the windshield 12 flows through the gap and returns into the vehicle cabin.

Referring to FIG. 3B, the bottom surface of the image-capturing-device cover 14 is partially removed to form a large number of intake ports 20. The intake ports 20 are provided in a matrix. This configuration allows for a large opening area of the intake ports 20 while minimizing lowering of the strength of the image-capturing-device cover 14. The intake ports 20 are disposed substantially at the center of the vehicle-environment monitoring device 10 in the left-right direction. Hence, it is possible to evenly send the air, supplied from the intake ports 20 and blown by the fan 15, in the left-right direction, thus effectively removing and preventing the fog in front of the image sensors 29 illustrated in FIG. 3A.

Figure 4:
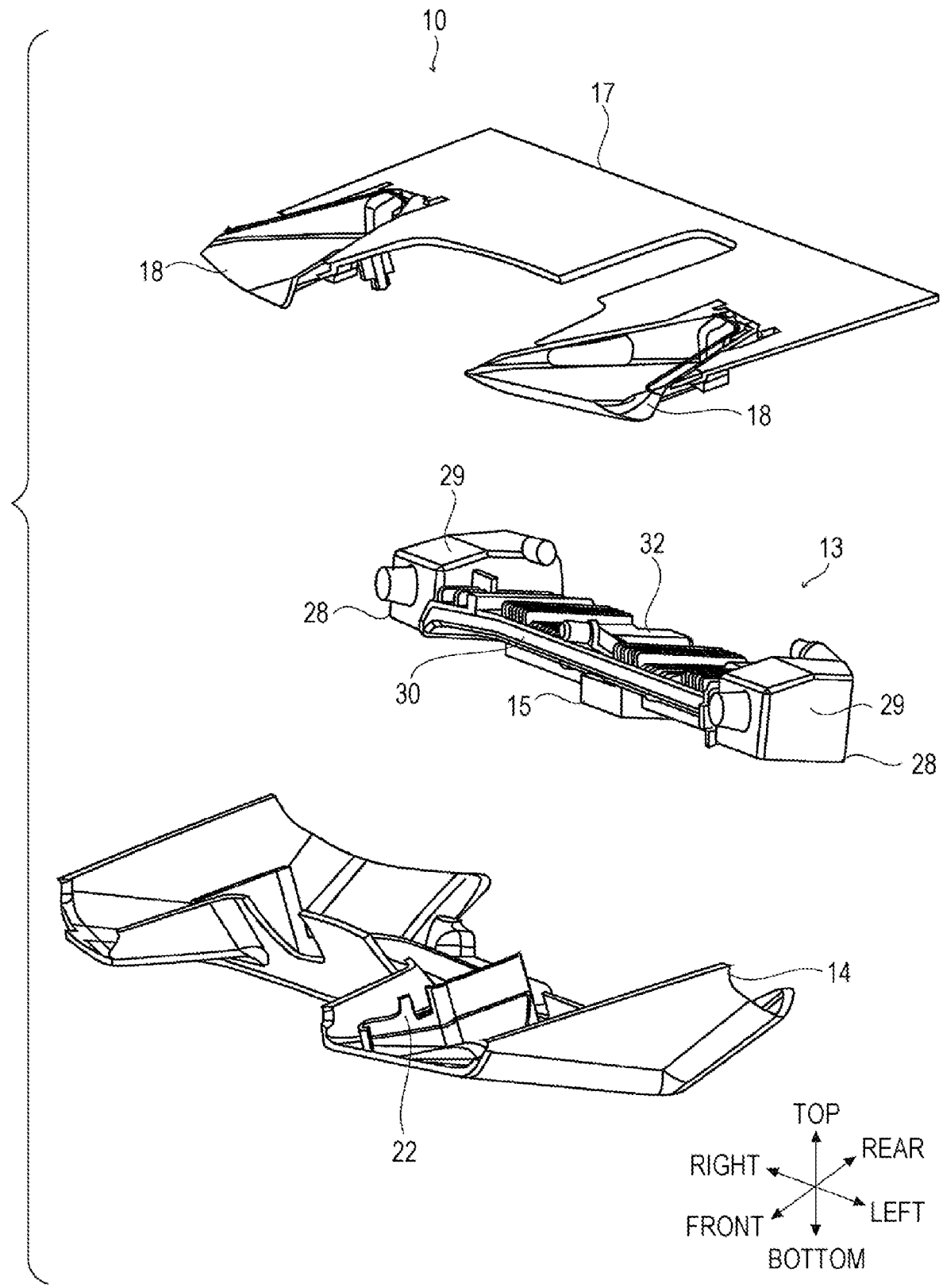
FIG. 4 is an exploded perspective view of the vehicle-environment monitoring device according to the example of the present invention.

FIG. 4 is an exploded perspective view illustrating the bracket 17, the image capturing module 13, and the image-capturing-device cover 14, which constitute the vehicle-environment monitoring device 10 described above, in a manner separated in the top-bottom direction.

The bracket 17 is formed of a synthetic resin plate molded into a predetermined shape. The reflection reduction members 18 are attached to the front end of the bracket 17.

The image capturing module 13 mainly includes a module substrate 30, image capturing units 28 attached to the left and right ends of the module substrate 30, the image processing device 32 mounted to the top surface of the module substrate 30, and the fan 15 attached to the bottom surface of the module substrate 30.

The module substrate 30 is formed of a metal plate, such as an aluminum plate, and supports the overall image capturing module 13. The module substrate 30 has a substantially rectangular shape whose longitudinal direction corresponds to the left-right direction. In addition to the image processing device 32 and the fan 15, other semiconductor devices, resistors, capacitors, various sensors, wiring members for coupling them one another, and the like are mounted on the module substrate 30.

The image capturing units 28 are attached to the left and right ends of the module substrate 30 and accommodate the image sensors 29, lenses, etc.

As has been described above, the image processing device 32 is a semiconductor device that performs predetermined image processing on the basis of the image data obtained by the image sensors 29. For example, the image processing device 32 is disposed substantially at the center of the module substrate 30 in the left-right direction. A radiating fin for cooling the image processing device 32 may be attached to the image processing device 32.

The fan 15, which is, for example, an axial fan or a centrifugal fan, takes in the air inside the vehicle cabin through the intake ports 20 and blows out the air. When the temperature of the image processing device 32 detected by the temperature detection device 33 is higher than or equal to a predetermined temperature, the fan 15 is rotated to blow the air to cool the image processing device 32.

The image-capturing-device cover 14 is a protection member that covers the image capturing module 13 and the reflection reduction members 18 from below. The left and right ends of the image-capturing-device cover 14 extend forward. The left, right, and front ends of the image-capturing-device cover 14 are aligned with the left, right, and front ends of the bracket 17. Hence, the image capturing module 13 is accommodated in a space surrounded by the bracket 17 and the reflection reduction members 18. A portion of the image-capturing-device cover 14 is made to project upward in a wall shape, forming an inner air-passage wall 22. The inner air-passage wall 22 forms an air passage inside the image-capturing-device cover 14, and the details thereof will be described below.

Referring to FIG. 5, the configuration of the image-capturing-device cover 14 will be described in detail. FIG. 5 is a perspective view of the image-capturing-device cover 14, as viewed from the upper rear side.

Referring to FIG. 5, the image-capturing-device cover 14 has the intake ports 20 at the center in the left-right direction. A supply air passage 16 extending from the intake ports 20 toward the right front side and the left front side is formed. The supply air passage 16 is a space defined between an outer air-passage wall 21 and the inner air-passage wall 22. The outer air-passage wall 21 and the inner air-passage wall 22 are formed by causing portions of the bottom of the image-capturing-device cover 14 to project in a wall shape. The outer air-passage wall 21 and the inner air-passage wall 22 are continuous with each other near the front end of the image-capturing-device cover 14. Hence, the supply air passage 16 is a space that is almost completely enclosed by the outer air-passage wall 21 and the inner air-passage wall 22.

The width, in the front-rear direction, of the portion of the supply air passage 16 having the intake ports 20 is larger than the width, in the front-rear direction, of the other portions of the supply air passage 16. This configuration enables a large amount of air to be introduced from the intake ports 20 to more effectively cool the image processing device 32. Furthermore, because the high-temperature air obtained by cooling the image processing device 32 can be blown to the windshield 12 through the supply air passage 16, the effect of preventing fogging of the windshield 12 is increased.

The right-side front-end portion of the outer air-passage wall 21 is reduced in height to form a low wall portion 27. Similarly, the left-side front-end portion of the outer air-passage wall 21 is reduced in height to form a low wall portion 26. As will be described below, the upper ends of the outer air-passage wall 21 and the inner air-passage wall 22 are in contact with the module substrate 30, the bracket 17, or the reflection reduction members 18 to form a closed air passage, i.e., the supply air passage 16. On the other hand, the upper ends of the low wall portion 26 and the low wall portion 27 do not reach the module substrate 30 or the other parts. With this configuration, blow-out portions, through which the air flowing through the supply air passage 16 is blown toward the front side, are formed between the low wall portions 26 and 27 and the module substrate 30 and the other parts.

As has been described above, by forming the outer air-passage wall 21 and the inner air-passage wall 22 on the image-capturing-device cover 14, the rigidity of the overall image-capturing-device cover 14 is increased. This minimizes the risk of the image-capturing-device cover 14 being broken at the time of a collision, thus preventing injury to an occupant due to the broken image-capturing-device cover 14.

Figure 6A:
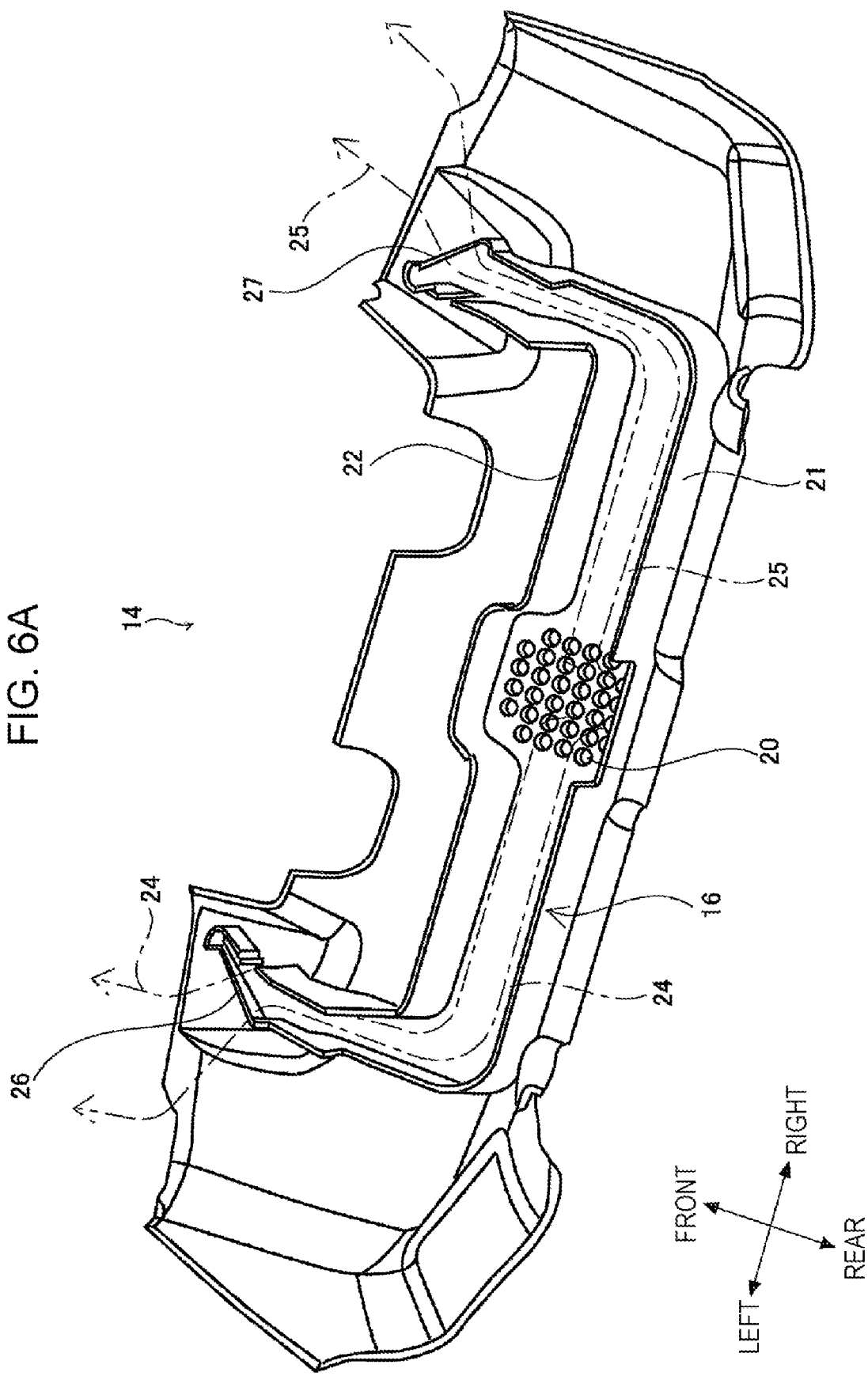

Referring to FIGS. 6A and 6B, the details of the air passage configuration inside the image-capturing-device cover 14 will be described. FIG. 6A is a perspective view of the image-capturing-device cover 14, as viewed from the upper rear side, and FIG. 6B is a perspective view of the image-capturing-device cover 14, as viewed from the upper front side.

Referring to FIGS. 6A and 6B, an air passage 24 and an air passage 25, along which the air blown by the fan 15 flows, are illustrated by one-dot chain lines. The air passage 24 is located on the left side of the supply air passage 16. More specifically, the air flowing along the air passage 24 flows from the intake ports 20 toward the left side, changes direction substantially perpendicularly toward the front side, flows above the low wall portion 26, and is blown toward the windshield 12 (not illustrated). The air passage 25 is located on the right side of the supply air passage 16. More specifically, the air flowing along the air passage 25 flows from the intake ports 20 toward the right side, changes direction substantially perpendicularly toward the front side, flows above the low wall portion 27, and is blown toward the windshield 12 (not illustrated).

Figure 7B:
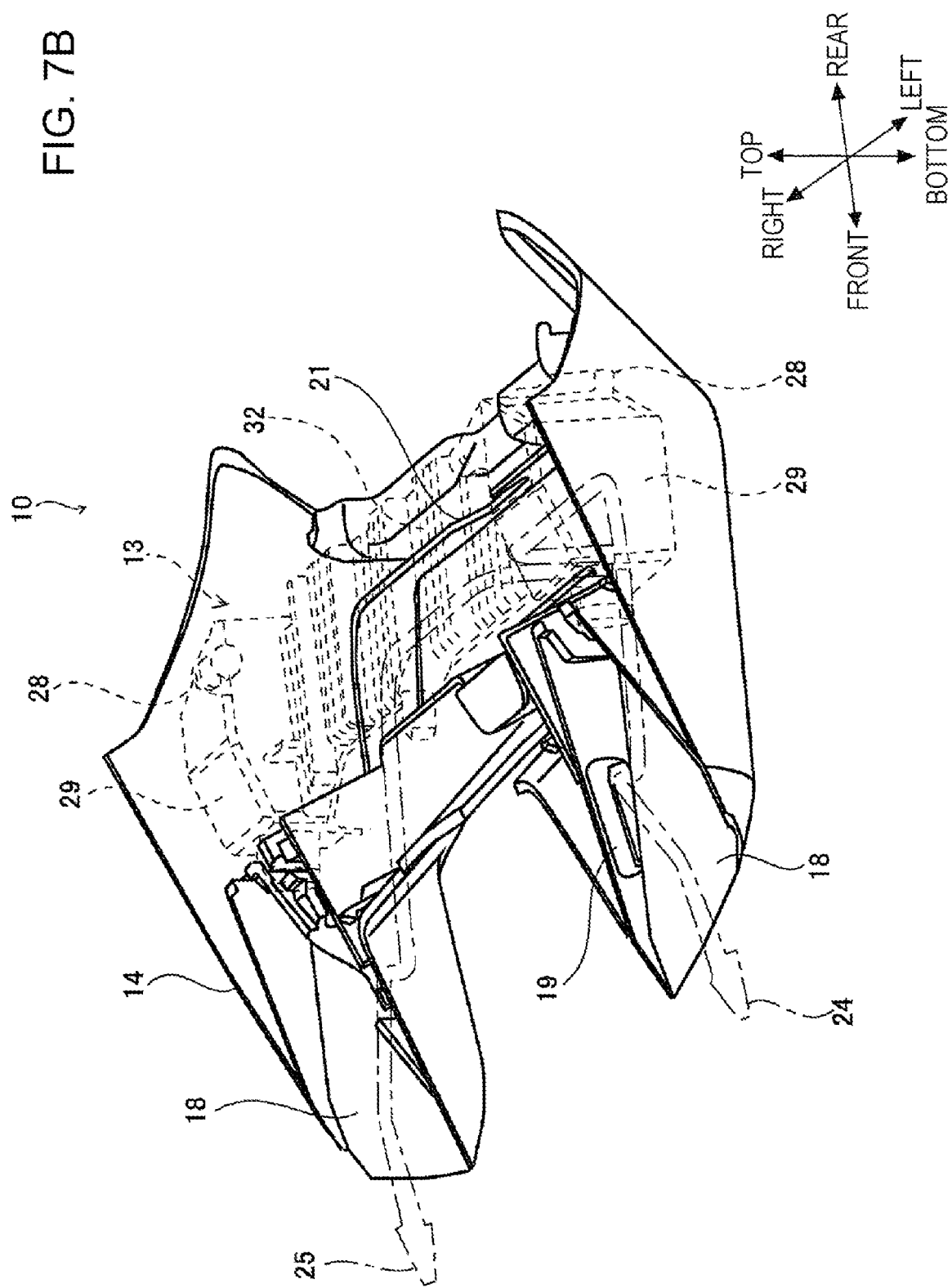

Referring to FIGS. 7A and 7B, the air passage 24 and the air passage 25 will be described in detail. FIG. 7A is a perspective view of the vehicle-environment monitoring device 10, as viewed from the upper rear side, and FIG. 7B is a perspective view of the vehicle-environment monitoring device 10, as viewed from the upper front side. FIGS. 7A and 7B do not illustrate the bracket 17.

Referring to FIG. 7A, the rear portions of the air passage 24 and the air passage 25 are covered by the module substrate 30 from above. In other words, the bottom surface of the image-capturing-device cover 14, the inner air-passage wall 22, the outer air-passage wall 21, and the module substrate 30 constitute the bottom surfaces, the front-side side surfaces, the rear-side side surfaces, and the top surfaces of the rear portions of the air passage 24 and the air passage 25, respectively.

The image processing device 32, which generates heat while operating, is mounted on the top surface of the module substrate 30. By forming the air passage 24 and the air passage 25 along the bottom surface of the module substrate 30 so as to extend in the longitudinal direction, the air flowing through the air passages 24 and 25 can exchange heat with the module substrate 30 for a longer time, thus efficiently cooling the image processing device 32 through the module substrate 30.

The front portions of the inner air-passage wall 22 are in contact with the bottom surface of the bracket 17 (not illustrated). The front portions of the outer air-passage wall 21 are in contact with the bottom surfaces of the reflection reduction members 18 (not illustrated). With this configuration, the front portions of the air passage 24 and the air passage 25 are formed.

Referring to FIG. 7B, the air passage 24 extends through the slit 19 provided in the inner side surface of the left-side reflection reduction member 18 toward the top surface of the left-side reflection reduction member 18. Hence, the air blown through the slit 19 is introduced into the gap between the reflection reduction member 18 and the windshield 12 (not illustrated). Similarly, the air passage 25 extends through the slit 19 (not illustrated) provided in the inner side surface of the right-side reflection reduction member 18 toward the gap between the reflection reduction member 18 and the windshield 12 (not illustrated). The warm air flowing through the air passage 24 and the air passage 25 heats the windshield 12 in front of the reflection reduction members 18, thus preventing the fogging of the windshield 12.

The fan 15 is disposed substantially at the center of the vehicle-environment monitoring device 10 in the left-right direction. In other words, the fan 15 is disposed substantially in the middle between the image sensors 29. Hence, the amount of air flowing through the air passage 24 and the amount of air flowing through the air passage 25 are equal, and the air heated to the same extent is supplied to the air passage 24 and the air passage 25. Hence, even and sufficient defogging effects can be obtained near the respective image sensors 29.

The vehicle-environment monitoring device 10, which monitors the situation outside the vehicle, according to this example includes: the image capturing module 13 that is disposed near the inner surface of the windshield 12 and that has the image processing device 32 and the image sensors 29 configured to capture images of the situation outside the vehicle; the image-capturing-device cover 14 that covers the image capturing module 13 from inside the vehicle cabin; the fan 15 that cools the image processing device 32 by introducing air into the image-capturing-device cover 14 and that blows the air toward the windshield 12; and the air passage 16 that is formed inside the image-capturing-device cover 14 and through which the air blown by the fan 15 flows toward the windshield 12. Hence, by using the fan 15, it is possible to introduce the air inside the vehicle cabin into the image-capturing-device cover 14 and to blow the air to the spaces formed between the image sensors 29 and the windshield 12 through the air passage 16. Furthermore, this air is heated as it cools the image processing device 32 and is blown to the spaces between the image sensors 29 and the windshield 12 in this state. Hence, the fan 15 serves as a cooling fan for cooling the image processing device 32, as well as a heating fan for blowing warm air to reduce fogging of the windshield 12. Hence, it is possible to prevent fogging of the windshield 12 near the image sensors 29 and to defog the windshield 12 if fogged. Thus, it is possible to accurately monitor the situation outside the vehicle using the image sensors 29.

In the vehicle-environment monitoring device 10, the air passage 16 is formed by the outer air-passage wall 21 and the inner air-passage wall 22, which are formed by causing portions of the inner surface of the image-capturing-device cover 14 to project in a wall shape. Thus, the air passage 16 can be formed with a simple configuration, in which portions of the inner surface of the image-capturing-device cover 14 are caused to project inward in a wall shape.

The vehicle-environment monitoring device 10 further includes the bracket 17 that is attached to the windshield 12 from inside the vehicle cabin. The image capturing module 13 and the image-capturing-device cover 14 are attached to the bracket 17. By attaching the image capturing module 13 and the image-capturing-device cover 14 to the bracket 17, which is attached to the windshield 12, the image capturing module 13 can be disposed in close proximity to the windshield 12. Thus, it is possible to obtain wide fields of view of the image sensors 29.

The vehicle-environment monitoring device 10 further includes the reflection reduction members 18 that are disposed near the image sensors 29 and the windshield 12. The air blown by the fan 15 is blown into spaces between the reflection reduction members 18 and the windshield 12. Hence, the reflection reduction members 18, which block the light entering the windshield 12 from below, are disposed substantially in tight contact with the windshield 12. Hence, although fog tends to be generated in the gaps between the reflection reduction members 18 and the windshield 12, by sending air to the gaps with the fan 15, fogging of the windshield 12 near these portions can be minimized.

In the vehicle-environment monitoring device 10, the image capturing module 13 includes the two image sensors 29 disposed away from each other, the fan 15 is disposed substantially in the middle between the image sensors 29, and the air blown by the fan 15 is blown, through the air passage 16, to the spaces between the windshield 12 and the image sensors 29. Hence, by disposing the fan 15 substantially in the middle between the image sensors 29, it is possible to substantially evenly send the air blown by the fan 15 to the spaces between the windshield 12 and the image sensors 29 and, thus, to prevent fogging of the windshield 12 near the image sensors 29.

The image processing device 32 of the vehicle-environment monitoring device 10 processes the image data obtained by the image sensors 29. Hence, although the image processing device 32 generates a large amount of heat during calculation, the image processing device 32 can be efficiently cooled by the fan 15 disposed near the image processing device 32. Hence, it is possible to maintain the processing speed of the image processing device 32 constant. Furthermore, by sending the high-temperature air obtained by cooling the image processing device 32 to the spaces between the windshield 12 and the image sensors 29, it is possible to more effectively defog the windshield 12.

In the vehicle-environment monitoring device 10, the intake ports 20, through which the air to be blown by the fan 15 is introduced from inside the vehicle cabin, are formed by providing openings in a portion of the image-capturing-device cover 14 below the fan 15. Hence, by introducing the air through the openings provided below the fan 15, the air can be efficiently introduced.

In the vehicle-environment monitoring device 10, the heater 35 is provided for the reflection reduction members 18. Because the reflection reduction members 18 are disposed in close proximity to the windshield 12, the windshield 12 can be effectively heated with the heater 35. Thus, it is possible to obtain a remarkable defogging effect.

In the vehicle-environment monitoring device 10, the heater 35 heats the reflection reduction members 18 when the temperature of the image sensors 29 measured by the thermometer is lower than or equal to a predetermined value. Because the heater 35 heats the reflection reduction members 18 only when the temperature of the image sensors 29 is low, that is, only when the temperature of the windshield 12 is low and thus can be fogged up, unnecessary overheating by the heater 35 is prevented. Thus, it is possible to reduce the power consumption.

Although the example of the present invention has been described above, the present invention is not limited to the above-described example.

For example, referring to FIGS. 3A and 3B, the image-capturing-device cover 14 and a rearview mirror may be formed as a single component, or the image-capturing-device cover 14 and a rearview mirror may be coupled together. With this configuration, by providing the intake ports 20 in the cover of the rearview mirror, the intake ports 20 cannot be viewed from the vehicle cabin. Thus, it is possible to improve the appearance of the vehicle-environment monitoring device 10.

The invention claimed is:

1. A vehicle-environment monitoring device capable of monitoring a situation outside a vehicle, the vehicle-environment monitoring device comprising:
   an image capturing module mountable near an inner surface of a window glass of the vehicle, the image capturing module comprising:
      a module substrate;
      two image sensors attached to the module substrate, and configured to capture images of the situation outside the vehicle through the window glass; and
      an image processing device attached to the module substrate between the two image sensors, the image processing device being configured to process image data obtained by the two image sensors; and
   a cover that covers the image capturing module, the cover comprising:
      a surface having an intake port;
      an inner air-passage wall projecting from the surface, the inner air-passage wall having an end in contact with the module substrate;
      an outer air-passage wall facing to the inner air-passage wall, the outer air-passage wall projecting from the surface, the outer air-passage wall having an end in contact with the module substrate; and
      a supply air passage being a space defined between the outer air-passage wall and the inner air-passage wall, the supply air passage extending from the intake port toward spaces between the window glass and each of the two image sensors, wherein
         the image capturing module further comprises a fan configured to introduce air into the cover through the intake port to cool the image processing device with the air so that the air becomes heated air by cooling the image processing device, and the fan is further configured to send the heated air to the spaces between the window glass and each of the two image sensors through the supply air passage.

2. The vehicle-environment monitoring device according to claim 1, wherein the cover further comprises:
an image-capturing-device cover that covers the image capturing module from below in a vehicle cabin of the vehicle, and
a bracket attached to the inner surface of the window glass, and
the image capturing module and the image-capturing-device cover are attached to the bracket.

3. The vehicle-environment monitoring device according to claim 1, wherein the cover further comprises reflection reduction members that are mounted in front of the two image sensors and that have contact with the inner surface of the window glass,
the reflection reduction members have first portions facing to the inner surface of the window glass, and second portions having slits,
each of the second portions is adjacent to corresponding one of the first portions, and
the fan is further configured to send the heated air to spaces between the reflection reduction members and the inner surface of the window glass through the supply air passage and the slits.

4. The vehicle-environment monitoring structure device according to claim 1, wherein the two image sensors are disposed away from each other, and
the fan is disposed substantially in a middle between the two image sensors.

5. The vehicle-environment monitoring device according to claim 1, wherein the intake port includes an opening that is provided in a portion of the cover adjacent to the fan.

6. The vehicle-environment monitoring device according to claim 1, wherein the cover further comprises reflection reduction members that are mounted in front of the two image sensors and that have contact with the inner surface of the window glass, and
a heating unit is provided for the reflection reduction members.

7. The vehicle-environment monitoring device according to claim 6, wherein the heating unit heats the reflection reduction members when a temperature of the two image sensors measured by a thermometer is lower than or equal to a predetermined value.

8. The vehicle-environment monitoring device according to claim 1, wherein the cover further includes a bracket attached to the inner surface of the window glass, and
the image capturing module is attached to the bracket.

9. The vehicle-environment monitoring device according to claim 1, wherein the fan is further configured to send the heated air through the supply air passage to the spaces between the window glass and each of the two image sensors to prevent the window glass from fogging.

10. The vehicle-environment monitoring device according to claim 1, wherein the cover further includes a portion having an opening, and a part in contact with the inner surface of the window glass,
the portion and the inner surface of the window glass define a space, and
the fan is further configured to blow the heated air into the space defined by the portion and the inner surface of the window glass.

11. The vehicle-environment monitoring device according to claim 1, wherein the supply air passage extends in a longitudinal direction of the module substrate.

12. The vehicle-environment monitoring device according to claim 1, wherein the supply air passage comprises a first portion having the intake port and a second portion other than the first portion, and
a width of the first portion is larger than a width of the second portion.

* * * * *